(12) United States Patent
Henry et al.

(10) Patent No.: US 9,766,734 B2
(45) Date of Patent: Sep. 19, 2017

(54) SYNCHRONIZED TOUCH INPUT RECOGNITION

(71) Applicant: NVIDIA Corporation, Santa Clara, CA (US)

(72) Inventors: William Henry, Los Gatos, CA (US); Thomas Dean Skelton, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 40 days.

(21) Appl. No.: 13/772,173

(22) Filed: Feb. 20, 2013

(65) Prior Publication Data

US 2014/0232664 A1    Aug. 21, 2014

(51) Int. Cl.
*G06F 3/041* (2006.01)
(52) U.S. Cl.
CPC .......... *G06F 3/0412* (2013.01); *G06F 3/041* (2013.01); *G06F 3/0416* (2013.01); *G06F 3/0418* (2013.01)
(58) Field of Classification Search
CPC ...... G06F 3/044; G06F 3/0412; G06F 3/0416; G06F 3/041; G06F 3/0418; G09G 2310/061
USPC .................... 345/173–174; 178/18.01–18.06
See application file for complete search history.

(56) References Cited

U.S. PATENT DOCUMENTS

| 2010/0110040 A1 | 5/2010 | Kim et al. | |
| 2011/0187677 A1 | 8/2011 | Hotelling et al. | |
| 2011/0210939 A1* | 9/2011 | Reynolds | G06F 3/0418 345/174 |
| 2012/0262389 A1* | 10/2012 | Kida | G06F 3/0412 345/173 |
| 2012/0262390 A1* | 10/2012 | Kida | G06F 3/041 345/173 |
| 2013/0057512 A1* | 3/2013 | Lillie et al. | 345/174 |
| 2013/0176213 A1* | 7/2013 | Toorians | G06F 3/0416 345/157 |
| 2013/0176251 A1* | 7/2013 | Wyatt et al. | 345/173 |
| 2013/0194229 A1* | 8/2013 | Sabo et al. | 345/174 |

(Continued)

FOREIGN PATENT DOCUMENTS

| AU | 2012101368 | 10/2012 |
| CN | 101501618 | 8/2009 |
| CN | 102339156 | 2/2012 |

(Continued)

*Primary Examiner* — Lun-Yi Lao
*Assistant Examiner* — Johny Lau (57) ABSTRACT

Embodiments are disclosed for a touch-based device and methods for operation thereof. One embodiment provides a touch-based device having a display with a plurality of pixels and a touch input sensor overlying the display. The touch input sensor has a plurality of touch regions, each of which overlie an associated set of the pixels. The touch-based device further comprises a display controller configured to update the pixels according to a schema during which pixels are updated during update periods. The touch-based device yet further comprises a touch controller configured to recognize selectively applied touch inputs at the plurality of touch regions. The touch controller and the display controller are synchronized such that, for a given touch region, touch input recognition is modified while the display controller is updating the set of pixels associated with that touch region.

23 Claims, 3 Drawing Sheets

(56) References Cited

U.S. PATENT DOCUMENTS

2013/0314342 A1* 11/2013 Kim ................ G06F 3/041
                                                    345/173
2014/0022185 A1* 1/2014 Ribeiro ............ G06F 3/0412
                                                    345/173

FOREIGN PATENT DOCUMENTS

| CN | 102402348 | 4/2012 | |
|---|---|---|---|
| CN | 102884496 | 1/2013 | |
| TW | 676530 | 2/2004 | |
| TW | 201229833 | 7/2012 | |
| TW | 201342191 | 10/2013 | |
| WO | WO 2007146780 A2 * | 12/2007 | ......... G02F 1/13338 |

* cited by examiner

SYNCHRONIZED TOUCH INPUT RECOGNITION

BACKGROUND

Typical touch-based devices, such as mobile devices, include a display in close proximity to a touch input sensor. In these devices, noise coupling between the display, touch input sensor, and various other components can affect the performance of the touch input recognition system. For example, switching of display pixels can generate noise that may affect devices that use electrical charge to recognize touch inputs. Some devices mitigate noise effects by increasing a voltage applied to the entire touch input sensor in order to increase the signal-to-noise ratio. Other approaches include measuring and filtering out ambient noise. However, devices employing these approaches still experience errors and other issues relating to touch performance, and the noise mitigation techniques they employ can consume significant amounts of power.

DETAILED DESCRIPTION

Touch-based devices, such as mobile computing devices, are being provided in ever smaller form factors. As a result, the physical separation between various components has similarly decreased. Although small form factors are often desirable, they can experience increased noise coupling between components which can produce design challenges and/or sub-optimal performance.

Some touch-based devices include a capacitive touch input sensor including, for example, Indium Tin Oxide "ITO" traces disposed on glass and/or plastic surface(s) overlying a display (e.g., LCD, LED, or OLED "panels"). Capacitive touch based devices can provide a performance advantage relative to other touch technologies, although the way that they recognize inputs may make them more susceptible to noise. Specifically, since inputs are recognized by measuring changes in capacitance, the device can be relatively more susceptible to switching noise, power supply noise, ambient electromagnetic energy/signals, etc.

Various mechanisms have been employed in order to address noise. Some devices charge their touch input sensors with a higher voltage to increase the signal-to-noise ratio. Although this can increase touch input accuracy and/or reduce erroneous touch inputs, this approach consumes additional power. Another approach is to observe noise and periodically calibrate the touch input sensors based on measured ambient noise characteristics. This approach can also consume additional power, and the ongoing monitoring and updating can add complexity and consume processing resources.

The present description is directed to a system in which the display and touch recognition systems are synchronized in order to improve touch recognition performance. Specifically, the control system that drives touch recognition is provided with information about the state of the display. For example, information can be passed to the touch system about which pixels are being updated, and/or whether a horizontal or vertical blanking period is occurring. The touch system can then use this information to control the way touch inputs are recognized, and thereby provide improved performance over the approaches described above. Examples of synchronization include using state information provided by the display controller to: (1) disable touch recognition in areas where display pixels are being updated; (2) only scan for touch inputs during blanking periods; (3) modify measurement voltages in areas where pixels are being updated; (4) use different filters in areas where pixels are being updated; (5) control touch input recognition based on how recently pixels have been updated. These and other examples will be described in more detail after first describing an example use environment.

Figure 1:
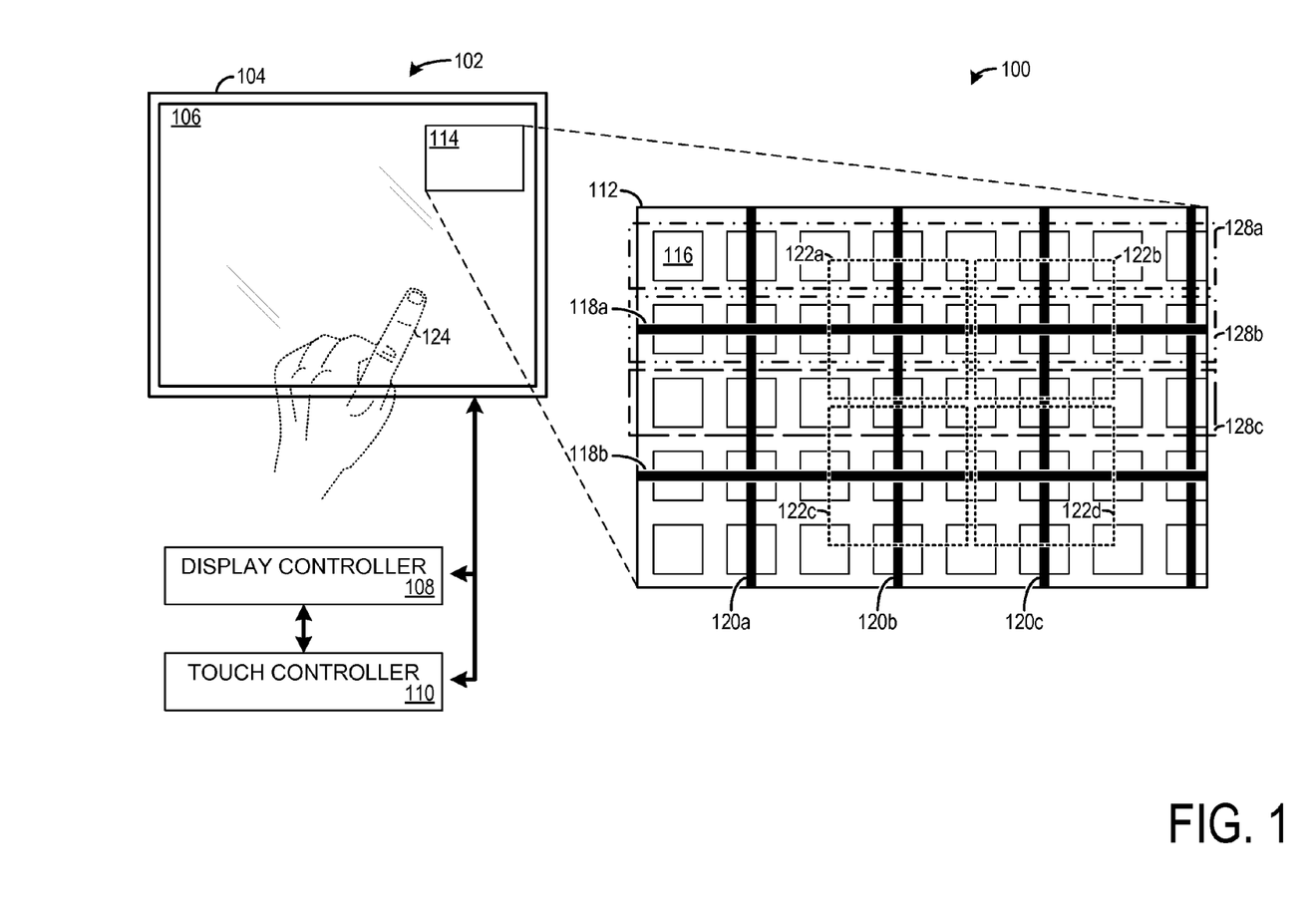
FIG. 1 schematically illustrates an example use environment for a touch-based device.
Figure 3:
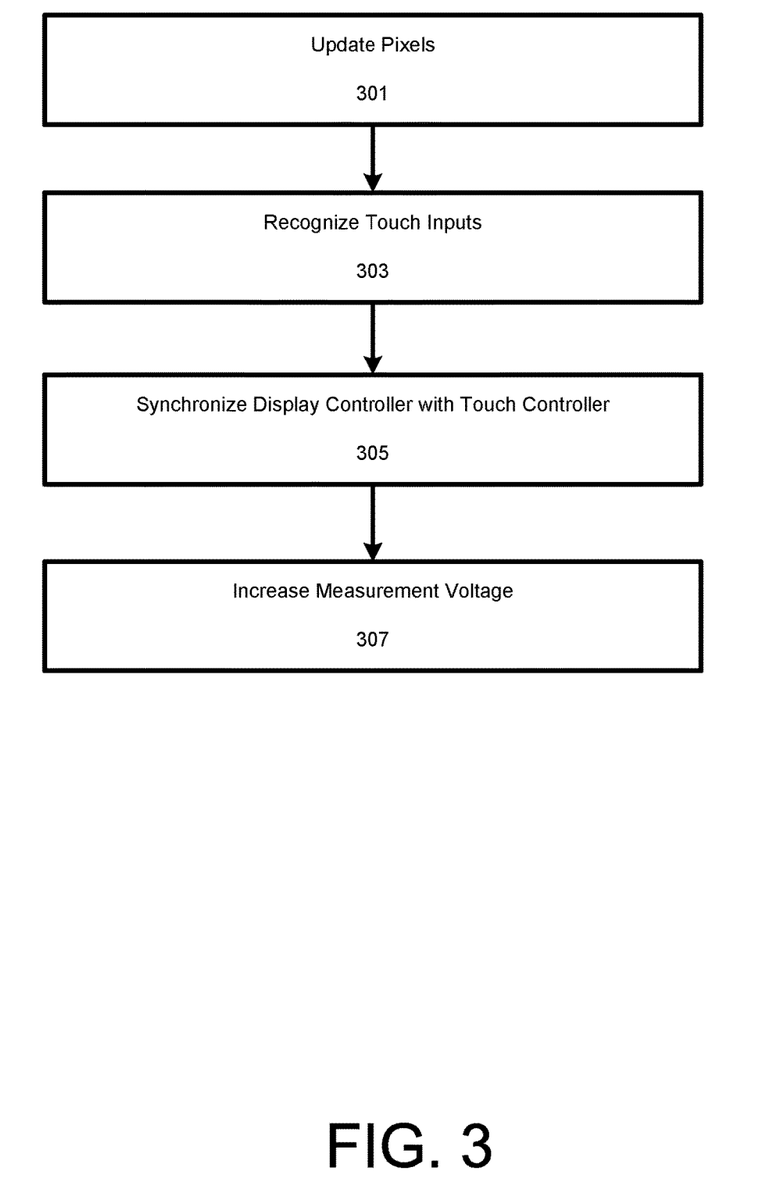
FIG. 3 illustrates an alternate process flow depicting a method for operating a touch-based device according to an embodiment of the present disclosure.

FIG. 1 schematically illustrates an example use environment 100 including touch-based device 102. FIG. 3 is also referenced herein to describe the operation of the touch-based device 102 in accordance with various embodiments. The touch-based device includes display 104 (e.g., display "panel") and touch input sensor 106 (e.g., sensor overlay substantially transparent to visible light) controlled by display controller 108 and touch controller 110, respectively. In the present description, the touch input sensor is "overlying" in the sense that it occupies the same 2-dimensional area as the display from the perspective of the viewer. "Overlying" does not require, however, that the sensor is between the display panel and the user, although this is the typical arrangement. Display controller 108 and/or touch controller 110 may be configured to interact with (e.g., send information to and/or receive information from) one another in order to provide intelligent and "synchronized" operation to improve touch performance, as will be described in greater detail below. Although capacitive-based touch input sensors and panel-based display devices will be described for the purpose of example herein, it will be appreciated any suitable sensing technologies and/or display technologies may be utilized without departing from the scope of the present disclosure. For example, the disclosed synchronization between display controller 108 and touch controller 110 may be utilized with optical touch input sensors, as updating of pixel(s) (e.g., rapid change in light intensity and/or color) may negatively impact optical touch recognition. This description is applicable to a wide range of systems in which display functionality can interfere with or otherwise affect touch recognition.

FIG. 1 further illustrates a close-up view 112 of a portion 114 of touch-based device 102 (e.g., portion of display 104 and corresponding overlying portion of touch input sensor 106). Display 104 includes a plurality of pixels 116, and although pixels 116 are illustrated as being arranged in a grid-like manner and displaced from the edges of adjacent pixels, it will be appreciated that this configuration is presented for ease of illustration—display 104 may have a substantially contiguous arrangement of pixels 116 and/or any other suitable configuration without departing from the scope of the present disclosure. Furthermore, it will be appreciated that although pixels 116 are illustrated as substantially square, the pixels may have different sizes and/or shapes in other embodiments.

View 112 further illustrates touch input sensor 106 as having horizontal traces 118 and vertical traces 120 that are used to detect touch inputs. Traces 118 and 120 may be spatially separated from each other and from a surface of display 104 along an axis normal to the surface (e.g., via one or more insulating layers, air gaps, etc.), for example. This specific trace configuration is presented as but one non-limiting example. For example, in other embodiments, the traces may be arranged in diamond-shaped patterns.

Regardless of trace configuration, the touch input sensor includes a plurality of touch regions 122, illustrated via dashed outlines, where touch inputs (e.g., via finger 124) are recognized. The touch regions are defined at the intersections of the horizontal and vertical traces. Generally speaking, a touch region is the smallest spatial unit by which touch inputs are recognized. The configuration of touch regions 122 substantially determines the "resolution" of touch input sensor 106. From the figure, it will also be appreciated that each touch region has a number of pixels that are associated with the touch region (e.g., pixels that fall within and/or that are in close proximity to the touch region).

As one non-limiting example, touch-based device 102 may include approximately 100 touch regions per inch of diagonal size of display 104 (e.g., 1000 touch regions for a 10.1" diagonal display), though other embodiments may include a different touch region density. It will be appreciated that the illustrated touch regions 122 are presented for the purpose of example and that a touch input sensor may have any suitable configuration of touch regions without departing from the scope of the present disclosure. For example, although illustrated as being substantially centered about an intersection of traces 118 and 120, each touch region 122 may be oriented relative to and associated with traces 118 and 120 in other configurations. As another example, touch regions 122 may include a plurality of contiguous regions and/or substantially non-rectangular regions in other embodiments.

As mentioned above, touch controller 110 may be configured to detect touch inputs via traces 118 and 120 of touch input sensor 106 via various touch input mechanisms. For example, two types of "projected capacitance" techniques may be utilized with touch-based device 102. One such type, referred to as "self capacitance," supplies a measurement voltage to the traces and measures changes in capacitance to detect touch inputs. The "mutual capacitance" approach supplies a measurement voltage to the traces in order to build up mutual capacitances with neighboring (e.g., overlapping) traces; changes in these mutual capacitances are measured in order to recognize touch inputs.

Touch controller 110 is therefore configured to cause the traces to be charged with a supply voltage and then scan the traces to monitor capacitance and thereby recognize touch inputs. Such scanning may include, for example, querying successive traces 118 and/or successive traces 120, though the trace scanning may be carried out via other methods.

With specific reference to example device 102, a touch input selectively applied to touch region 122a would effect a change in capacitance of vertical trace 120b and of horizontal trace 118b. In some embodiments, this input could also potentially effect a change in capacitance of one or more additional traces, such as, for example, horizontal trace 118a, vertical traces 120a and/or 120c, etc. Accordingly, touch controller 110 could use capacitance observations at any of these locations in assessing whether a touch input was applied to touch region 122a.

In self-capacitance scenarios, it may not be possible to effectively differentiate between single and multiple touches on a particular trace, as capacitance is measured on a trace-by-trace basis in these scenarios. For example, multiple touch inputs along trace 118b (e.g., at touch input regions 122c and 122d) may effect a change in capacitance of trace 118b that is more or less equivalent to a change in capacitance effected by a single touch input at a different touch region along trace 118b. In other words, the change in capacitance could be recognized as a single, erroneous touch input (e.g., recognized at a different location than one or more of the touch inputs) along the trace(s), if any touch input(s) are recognizable at all.

Accordingly, in mutual capacitance scenarios, touch controller 110 may be configured to detect a change in capacitance at/between one or more intersections of traces 118 and traces 120, as physical separation between traces 118 and 120 along an axis normal to a viewing surface of display 104 may define such capacitances. As each intersection may therefore be independently "accessible," such a configuration may potentially provide improved performance by providing improved touch resolution and/or providing multi-touch ability. In other words, at least one discrete touch input may be recognized at each intersection 126.

Regardless of the specific configuration of touch input sensor 106 and touch controller 110, display controller 108 may be configured to update pixels 116 of display 104 (as depicted in step 301 FIG. 3), according to a pre-defined schema that includes "update periods" in which one or more pixels are being updated and "blanking periods" in which none of the pixels are being updated. Updating refers to use of any mechanism that operates to change or refresh color, brightness or other characteristics of a pixel. Updating may include, for example, manipulation of light emission and/or modulation mechanisms.

The updating schema may be carried out in a variety of different ways. As one non-limiting example, display 104 may be configured to update a first row 128a of pixels 116 before updating a second row 128b of the pixels, with a horizontal blanking period occurring between the row updates. As another example, display 104 may be configured to update first row 128a and then third row 128c, with an intervening horizontal blanking period, and without updating second row 128b (e.g., when providing "interlaced" visual information). After updating of the last row, the schema may include a vertical blanking period before another updating cycle begins.

Pixels 116 of each row 128 may be updated on a pixel-by-pixel basis (e.g., sequentially updating each pixel in a particular row), on a row-by-row basis (e.g., all pixels of the row updated substantially concurrently), and/or according to other suitable schemas (e.g., all pixels of the display concurrently updated). It will be appreciated that these scenarios are presented for the purpose of example; the display-touch synchronization described herein can be employed with a wide range of update schemas.

Operation of display 104 and/or display controller 108 can affect recognition of touch inputs by touch input sensor 106 and/or touch controller 110, for example, due to the proximity of the various components (e.g., touch input sensor 106 overlying display 104). It may therefore be desirable for touch controller 110 to be explicitly aware of the state of the display controller and display, such as whether pixels are being updated, which pixels are being updated, whether the display is in a horizontal or vertical blanking period, etc. This state awareness can be used to modify touch input recognition (e.g., by intelligently filtering noise, selectively enabling/disabling touch input recognition, etc.) provided via touch input sensor 106, as depicted in step 303 of FIG. 3.

Accordingly, in various embodiments, display controller 108 and touch controller 110 may be synchronized (as depicted in step 305 of FIG. 3), in order to provide potentially improved operation over existing touch-based devices.

The terms "synchronized" and the like are not intended to denote any synchronization between signals (e.g., clock signals) of the display controller and the touch controller. Instead, this terminology denotes a cooperation (e.g., via direct sharing of information) of the display controller and the touch controller such that operation of the touch controller at least partially depends on a state of the display controller and, potentially, vice versa.

By understanding a state of the display controller (e.g., if/what pixel(s) are being updated), the embodiments herein can provide selective and intelligent modification of touch input recognition. For example, accounting for the fact that pixel updates can generate localized noise or other interference (e.g., as the pixel is switched), the touch-display synchronization described herein can modify touch recognition for touch regions associated with the updating pixels, relative to that employed in the other touch regions.

It will be appreciated that touch input recognition may be modified according to various state characteristics of the display and/or the display controller. As one non-limiting example, upon detecting a change in the refresh rate of display 104, a scanning frequency of touch input controller (e.g., a rate at which trace capacitances are queried) may be updated to substantially match the display refresh rate in some embodiments. As another example, a lower refresh rate may result in less noise being generated by the display, and therefore the measurement voltage of the touch input sensor may be decreased as the refresh rate decreases in order to save power. Similarly, the measurement voltage may be increased as the refresh rate increases (as depicted in step 307 of FIG. 3) in order to increase the signal-to-noise ratio of the touch input sensor output, as described above. In this way, the touch input sensor may be intelligently "synced" to the display controller, thereby potentially decreasing power consumption as compared to approaches utilizing continuous noise monitoring and filtering.

Cooperation between display controller 108 and touch controller 110 may enable additional power savings in other embodiments. For example, a lower-power mode of touch-based device 102 and/or individual component(s) thereof may be effected during one or more periods of the display update schema. For example, a decreased measurement voltage may be utilized during periods of decreased noise (e.g., blanking periods). It will be appreciated that a "lower-power mode" refers to any operating mode during which less power is consumed in comparison to a "standard" operating mode. As such, it will be appreciated that the lower-power mode may be effected via various mechanisms (e.g., selectively restricting power, throttling clock signals, etc) without departing from the scope of the present disclosure.

Figure 2:
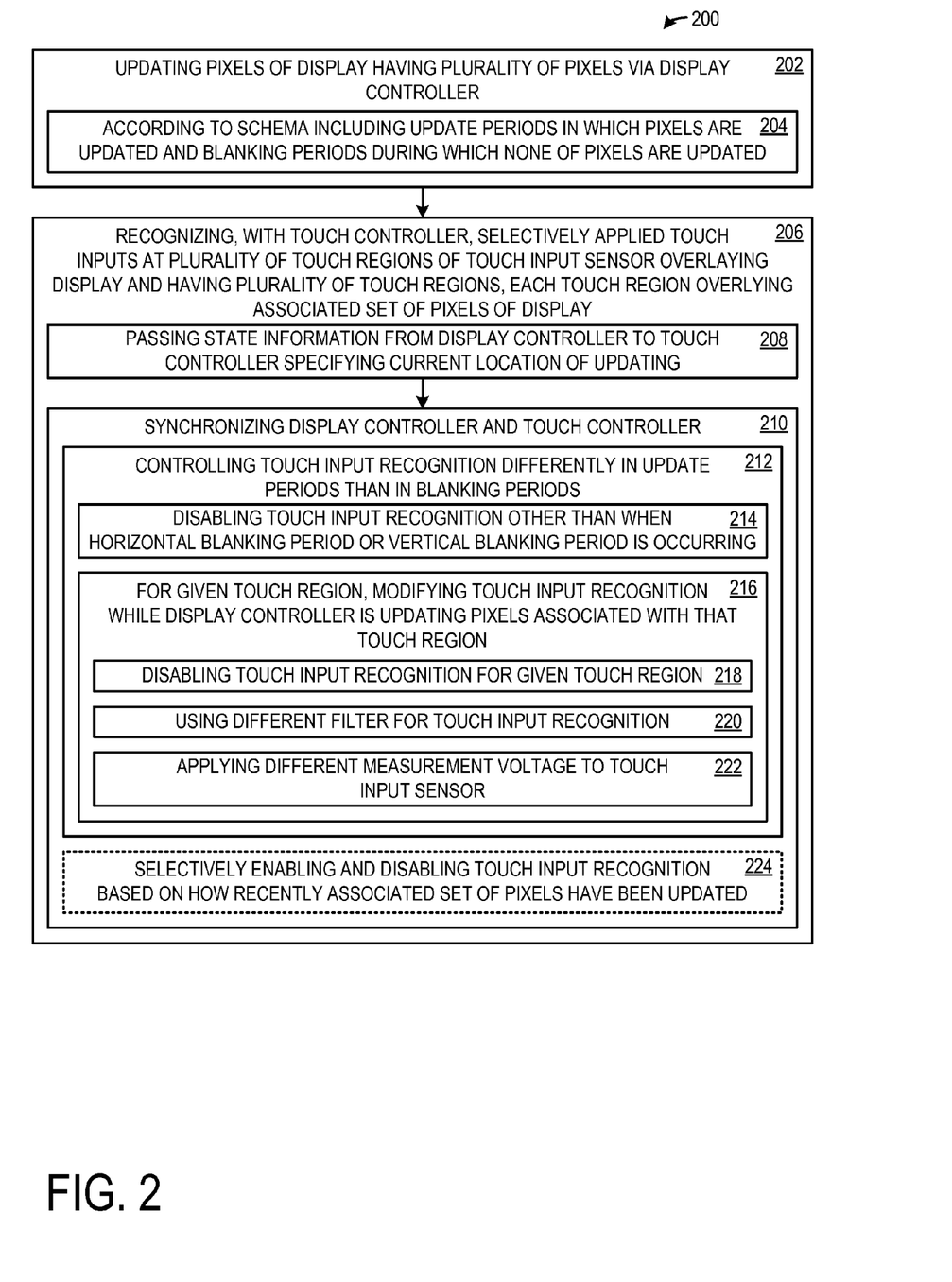
FIG. 2 illustrates a process flow depicting a method for operating a touch-based device according to an embodiment of the present disclosure.

Turning now to FIG. 2, a process flow depicting an embodiment of a method 200 for operating a touch-based device (e.g., touch-based device 102) is illustrated. At 202, method 200 includes updating pixel(s) of a display device (e.g., display device 104) having a plurality of pixels. As described above, the updating may be controlled by a display controller (e.g., display controller 108 of FIG. 1). As shown at 204, an update schema may be employed including update periods and blanking periods. The schema may be repeatedly executed in a sequence, in which pixels are updated row by row during row update periods that are followed by horizontal blanking periods, with a vertical blanking period following update of a last row of pixels (e.g., at the end of an update cycle). However, it will be appreciated that the display may be updated according to any suitable repeating and/or non-repeating schema without departing from the scope of the present disclosure.

At 206, method 200 further includes recognizing, with a touch controller (e.g., touch controller 110), selectively applied touch inputs at a plurality of touch regions of a touch input sensor overlaying the display. As described above, each touch region is associated with a set of pixels of the display.

Again, it may be desirable to understand a "state" of the display controller. State awareness can be used to intelligently mitigate negative effects on touch performance arising from operation of the display controller and/or controlled display devices. Accordingly, the example method may include, as shown at 208, passing state information from the display controller to the touch controller that specifies a current location of updating. The current location may indicate, for example, a set (e.g., row and/or column) of pixels and/or a single pixel being updated. The current location can also indicate that the update schema is located temporally in a horizontal or vertical blanking period, and therefore between update periods. In addition to update location, the state information may include any other suitable information regarding the state of the display and/or display controller, including, but not limited to, a refresh rate and/or an operating mode (e.g., "low power," "high performance," etc.).

Regardless of how state information of the display and/or the display controller is provided to and understood by the touch controller, the state information may be used, as shown at 210, to synchronize the display controller and the touch controller. As described above, this is performed so that that operation of the touch controller at least partially depends on a state of the display controller and, potentially, vice versa.

Synchronization between the display controller and the touch controller may enable the touch controller to dynamically and intelligently modify touch input recognition based on a state of the display controller. For example, it will be appreciated that additional noise may be present while one or more pixels are being updated (i.e., during an update period). The touch-display synchronization may therefore include, for example and as shown at 212, controlling touch input recognition differently in update periods than in blanking periods.

In some embodiments, the differential control at 212 may include, at 214, disabling touch input recognition other than when a horizontal blanking period or a vertical blanking period is occurring. In other words, as noise may be relatively high during update periods, touch input may be disabled during the update periods and permitted only during blanking periods.

In settings where greater granularity is desired, the method may include, as shown at 216, modifying touch input recognition in a touch region while the display controller is updating the pixels associated with that touch region. In other words, touch input recognition may be provided at a particular touch region according to a baseline or default approach when the touch region's pixels are not being updated, but then modified from that approach when the associated pixels are being updated. As there typically are multiple pixels associated with each touch region, and as the associated pixels may not be updated substantially concurrently (e.g., different rows in a row-by-row update schema), it will be appreciated that the touch input recognition may be modified while any one or more of the associated pixels are being updated.

The modification of touch input recognition for a given touch region may be implemented only for part of a given update period, since the update period typically will include updating pixels that are spatially displaced from the touch region (e.g., in a pixel-by-pixel, row-by-row update schema). In general, it may be desirable to modify touch input recognition only during the interval in which display operation is likely to affect the relevant portion of the touch input sensor (e.g., via noise from pixels being switched).

The specific way in which touch recognition is modified may depend on, for example, the touch input sensor technology used, noise characteristic(s), and/or other considerations. One option for modifying touch input recognition, as shown at 218, is to disable touch input recognition in a touch region while its pixels are being updated. This approach might be appropriate if the noise present during updating of the associated pixels is particularly high or disruptive. A more specific implementation of the selective disabling can be employed in connection with row update periods. Specifically, in embodiments utilizing a row-by-row display update schema, touch input recognition for touch regions associated with a particular row of pixels can be disabled during the row update period then enabled during the blanking period following the row update.

In other embodiments, modifying touch input recognition can include, as shown at 220, using a different filter for touch input recognition at the touch region where pixels are being updated. Such a filter may be defined via hardware and/or software in various embodiments, and may utilize various filtering techniques(s) without departing from the scope of the present disclosure. In some scenarios, a particular filter may be used as a "baseline" filter when the associated set of pixels is not being updated, with a different filter being used when the associated set of pixels is being updated. Differential filtering also encompasses the situation when a particular filter is used in one state (updating or not updating) with no filter being used in the other state.

As briefly mentioned above, some touch input sensors (e.g., capacitance sensors) may use one or more measurement voltages provided by a touch input controller. Measurement voltages may be modulated, for example, to dynamically vary a signal-to-noise ratio to improve touch input recognition. Accordingly, in yet other embodiments, the modified operation based on the synchronization can include, as shown at 222, applying a different measurement voltage to the touch input sensor in the touch region where pixels are being updated. Similar to the above-described filtering mechanisms, a particular measurement voltage may be used as a baseline when the set of pixels is not being updated, with a different measurement voltage being used during updates in the region. In particular, a higher voltage may be used during updates to increase signal-to-noise ratio and improve touch input recognition. It will be appreciated that it may be desirable to intelligently and selectively provide such an increased measurement voltage, as is made possible by the synchronization described herein, since higher voltages increase power consumption and can potentially increase wear on the touch sensors. Although described as a single measurement voltage, it will be appreciated that a plurality of measurement voltages and/or other measurement signals may be applied and/or modulated based on synchronization of the display controller and the touch input controller.

Although described individually, the modification mechanisms 218, 220, and 222 may be combined in various ways without departing from the scope of the present disclosure. As one non-limiting example, modifying the touch input recognition may include both using a different filter and applying a different measurement voltage in some embodiments. It will be further appreciated that the application of such techniques may be dynamically varied during device operation (e.g., according to changes in observed noise characteristics, refresh rate, power mode, etc.).

As still another example, the display and touch operation may be synchronized, as shown at 224, to selectively enable and disable touch input recognition for a given touch region based on how recently the associated set of pixels have been updated. If the pixels in a given touch region have been updated within a threshold amount of time, touch recognition can be permitted in that interval because it is assured that some amount of time will still pass before they are updated again. Thus, recognition can be permitted during that interval because the display and controller will not create noise or other interference during that period.

In summary, a touch-based device according to embodiments of the present disclosure may be configured to intelligently and selectively provide touch input recognition based on synchronization between a touch input controller and a display output controller. Using the cooperation between the controllers, it may be possible to provide improved touch input performance (e.g., via improved noise mitigation mechanism(s)) while potentially also providing improved power consumption and/or resource utilization, as compared to the existing approaches in which no coordination is employed.

Aspects of this disclosure have been described by example and with reference to the illustrated embodiments listed above. Components that may be substantially the same in one or more embodiments are identified coordinately and are described with minimal repetition. It will be noted, however, that elements identified coordinately may also differ to some degree. The claims appended to this description uniquely define the subject matter claimed herein. The claims are not limited to the example structures or numerical ranges set forth below, nor to implementations that address the herein-identified problems or disadvantages of the current state of the art.

The invention claimed is:

1. A touch-based device, comprising:
a display having a plurality of pixels;
a touch input sensor overlying the display and comprising a plurality of touch regions overlying an associated set of the pixels;
a display controller configured to update the pixels according to a schema during which pixels are updated during update periods; and
a touch controller configured to recognize selectively applied touch inputs at the plurality of touch regions,
wherein the touch controller and the display controller are synchronized wherein for a given touch region, touch input recognition is modified while the display controller is updating the set of pixels associated with that touch region,
wherein the display controller and the touch controller are further synchronized based on an exchange of state information, the state information comprising at least a refresh rate of the display controller,
wherein a measurement voltage applied to the touch input sensor is increased based on an increase in the refresh rate of the display controller.

2. The touch-based device of claim 1, wherein the touch input recognition is modified by disabling touch input recognition for the given touch region while the display controller is updating the set of pixels associated with that touch region.

3. The touch-based device of claim 1, wherein the touch input recognition is modified by using, for the given touch region, a different filter for touch input recognition while the display controller is updating the set of pixels associated with the region.

4. The touch-based device of claim 1, wherein the touch input recognition is modified by applying, for the given touch region, a different measurement voltage to the touch input sensor.

5. The touch-based device of claim 1, wherein the touch controller and the display controller are synchronized wherein, for a given touch region, touch input recognition is selectively enabled and disabled based on how recently the associated set of pixels have been updated.

6. The touch-based device of claim 1, wherein the update periods are separated by blanking periods during which none of the pixels are updated, and wherein the display controller and touch controller are synchronized to control recognition of touch inputs based on whether the touch-based device is in an update period or a blanking period.

7. The touch-based device of claim 6, wherein the pixels are arranged in a plurality of rows with the schema including a row update period for each row followed by a horizontal blanking period, the display controller and the touch controller being synchronized wherein, for a given row of pixels, touch input recognition for touch regions associated with the row of pixels is modified by disabling touch input recognition during the row update period and enabling touch input recognition during the horizontal blanking period following the row update period.

8. The touch-based device of claim 6, wherein the blanking periods comprise horizontal blanking periods and vertical blanking periods, and wherein the display controller and touch controller are synchronized to disable touch input recognition for one or more of the touch regions during the update periods and enable touch recognition for those touch regions during the horizontal and vertical blanking periods.

9. A method of operating a touch-based device including a touch input sensor overlying a display having a plurality of pixels, the touch input sensor comprising a plurality of touch regions, each of which overlie an associated set of the pixels of the display, the method comprising:
updating the pixels, wherein such updating is controlled by a display controller;
recognizing, with a touch controller, selectively applied touch inputs at the plurality of touch regions;
synchronizing the display controller and the touch controller wherein, for a given touch region, the recognizing of selectively applied touch inputs comprises modifying touch input recognition while the display controller is updating the pixels associated with that touch region, the synchronizing being performed based on exchanging state information between the display controller and the touch controller, the state information comprising at least a refresh rate of the display controller; and
increasing a measurement voltage applied to the touch input sensor based on an increase in the refresh rate of the display controller.

10. The method of claim 9, wherein the modifying of touch input recognition comprises disabling touch input recognition for the given touch region while the display controller is updating the set of pixels associated with that touch region.

11. The method of claim 9, wherein the modifying of touch input recognition comprises, for the given touch region, using a different filter for touch input recognition while the display controller is updating the set of pixels associated with the region.

12. The method of claim 9, wherein the modifying of touch input recognition comprises, for the given touch region, applying a different measurement voltage to the touch input sensor.

13. The method of claim 9, further comprising selectively enabling and disabling touch input recognition for a given touch region based on how recently the associated set of pixels have been updated.

14. The method of claim 9, wherein the pixels are updated by the display controller according to a schema comprising update periods during which the pixels are updated and blanking periods during which none of the pixels are updated, the method further comprising synchronizing the display controller and the touch controller so that touch input recognition is controlled differently in update periods than in blanking periods.

15. The method of claim 14, wherein the pixels are arranged in a plurality of rows with the schema comprising a row update period for each row followed by a horizontal blanking period, the display controller and the touch controller being synchronized wherein, for a given row of pixels, touch input recognition for touch regions associated with the row of pixels is modified by disabling touch input recognition during the row update period and enabling touch input recognition during the horizontal blanking period following the row update period.

16. The method of claim 14, wherein the blanking periods comprise horizontal blanking periods and vertical blanking periods, and wherein the display controller and touch controller are synchronized to disable touch input recognition for one or more of the touch regions during the update periods and enable touch recognition for those touch regions during the horizontal and vertical blanking periods.

17. A method of operating a touch-based device comprising a touch input sensor overlying a display having a plurality of pixels, the touch input sensor having a plurality of touch regions, each of which overlie an associated set of the pixels of the display, the method comprising:
updating the pixels, wherein such updating is controlled by a display controller according to a repeatedly executed sequential schema, during which pixels are updated sequentially row by row during row update periods that are followed by horizontal blanking periods, with a vertical blanking period following update of a last row of pixels;
passing state information from the display controller to a touch controller configured to recognize selectively applied touch inputs at the plurality of touch regions, such state information specifying a current location of updating the sequential schema and a refresh rate of the display controller;
controlling, with the touch controller, touch input recognition based on the state information; and
increasing a measurement voltage applied to the touch input sensor based on an increase in the refresh rate of the display controller.

18. The method of claim 17, wherein the controlling of touch input recognition based on the state information comprises disabling touch input recognition for one of the touch regions when the state information indicates that a pixel in the touch region is being updated.

19. The method of claim 17, wherein the controlling of touch input recognition based on the state information comprises disabling touch input recognition other than when the state information indicates that a horizontal blanking period or a vertical blanking period is occurring.

20. The method of claim 17, wherein the controlling of touch input recognition based on the state information includes, when the state information indicates that a pixel in one of the touch regions is being updated, performing at least one of (i) using a different filter for touch recognition in the touch region; and (ii) applying a different measurement voltage to the touch input sensor for the touch region.

21. The touch-based device of claim 1, wherein the touch input recognition is performed for a touch region according to a default approach when the set of pixels associated with the touch region are not being updated.

22. The touch-based device of claim 1, wherein a measurement voltage applied to the touch input sensor is decreased based on at least one of:

a decrease in a display refresh rate of the display controller; and during a blanking period corresponding to a period when the pixels are not being updated.

23. The touch-based device of claim 1, wherein the touch controller is operable to update a scanning frequency of the touch input sensor to substantially match a change in the refresh rate of the display controller.

\* \* \* \* \*